United States Patent [19]

Pearce

[11] 4,440,731
[45] Apr. 3, 1984

[54] PROCESS FOR REMOVAL OF CARBON DIOXIDE FROM INDUSTRIAL GASES

[75] Inventor: Roscoe L. Pearce, Lake Jackson, Tex.

[73] Assignee: The Dow Chemical Company, Midland, Mich.

[21] Appl. No.: 299,689

[22] Filed: Sep. 8, 1981

[51] Int. Cl.$^3$ .............................................. B01D 53/34
[52] U.S. Cl. ................................... 423/228; 423/226; 423/229; 422/13; 252/389 R; 252/390; 252/392
[58] Field of Search ....................... 423/226, 228, 229; 252/388, 389 R, 390, 392, 400 R, 401

[56] References Cited

U.S. PATENT DOCUMENTS

| | | | |
|---|---|---|---|
| 1,989,004 | 1/1935 | Fife | 423/228 |
| 2,377,966 | 6/1945 | Reed | 423/229 |
| 3,137,654 | 6/1964 | Johnson et al. | 423/229 |
| 3,864,449 | 2/1975 | Homberg et al. | 423/228 |
| 4,094,957 | 6/1978 | Sartori et al. | 423/228 |
| 4,102,804 | 7/1978 | Clouse et al. | 252/392 |
| 4,143,119 | 3/1979 | Asperger et al. | 252/389 R |

*Primary Examiner*—Edward J. Meros
*Assistant Examiner*—Jackson Leeds
*Attorney, Agent, or Firm*—G. R. Baker

[57] ABSTRACT

Corrosion inhibiting compositions for use in aqueous absorbent gas-liquid contacting processes for recovering carbon dioxide ($CO_2$) from industrial gas and oil combustion and partial combustion process flue gases, particularly employing copper carbonate, in combination with one or more of dihydroxyethylglycine, alkali metal permangenate, alkali metal thiocyanate, nickel or bismuth oxides with or without an alkali metal cartonate. The inhibitors are effective in reducing corrosion of metals in contact with the aqueous absorbent in the absorbent regeneration section of the plant as well as reduce the thermal degradation of the absorbent when high oxygen content combustion gases are treated to recover the $CO_2$.

3 Claims, No Drawings

PROCESS FOR REMOVAL OF CARBON DIOXIDE FROM INDUSTRIAL GASES

BACKGROUND OF THE INVENTION

Processes for the removal of carbon dioxide ($CO_2$) from industrial gases (e.g. natural gas, refinery gas, and certain synthetic gases) and the like are well known to the commercial petroleum and chemical industries. Likewise, numerous absorbents, generally aqueous based, have been employed in the gas-liquid processes of industry. Among the more widely employed solvents are the alkanolamines (e.g., monoethanolamine (MEA), diethanolamine (DEA), methyl diethanolamine (MDEA)), sodium carbonate, sulfolane and sulfolanediisopropanolamine (Shell's Sulfinol process) which are corrosive to metals, particularly at temperatures of regeneration used in most aqueous absorbent gas purification and recovery processes. These absorbents are also subject to thermal degradation particularly in the presence of metals. The degradation products of both metal corrosion and degradation, as well as the acid gases absorbed, accelerate both corrosion and absorbent degradation.

A less well known, yet commercially practiced application of gas treating (absorbing), is the removal of $CO_2$ from gas streams, e.g. flue gas, containing oxygen from a few parts per million to about two percent. The degradation occurs as described in U.S. Pat. No. 3,137,654 which reports even small amounts of oxygen cause deterioration of ethanolamine and diethanolamine. Corrosion likewise accompanies these applications due in part to the types of metals used in commercial plants.

The commercial scale operations, carried out today usually employs absorbents such as aqueous alkanolamine solutions having amine concentrations from 10 to about 20 percent. These processes are commonly sized such that the solvent circulates at rates to absorb (load) acid gases into the solution at about 20 to 40 percent of its theoretical capacity when the oxygen content of the gas being treated is only a few parts per million.

The lesser known commercial application, $CO_2$ removal from gas streams containing a few parts to about two percent oxygen, or air as in U.S. Pat. No. 3,137,654, utilize alkanolamine concentrations ranging from 7 to 12 percent and in some exceptional cases as high as 24 percent (the concentration of a 4 N amine solution reported in U.S. Pat. No. 3,137,654)

While many of these commercial processes use various additives to abate both corrosion and degradation, and most inhibitor formulations are based on patent and published literature technology, which allude to and even claim utility in the presence of oxygen, the experience in the field has been conflicting at best. Commercial proceses audited and/or reported in the literature routinely limit the amount of oxygen (in the presence of $CO_2$) to only a few percent. Generally the plants are designed for maximum loadings of less than 50 percent of theoretical solvent capacity while employing 10 to 20 percent amine concentrations of the aqueous absorbent solutions to control corrosion and solvent degradation. However, considerable degradation as well as poor corrosion inhibition profiles are still obtained.

In some instances activated carbon absorbers are used in an effort to remove the degradation products and corrosion products. However, in the instance of $CO_2$ removal, U.S. Pat. No. 3,137,654 teaches that activated carbon filters in the amine circuit enhance the degradation rate of MEA rather than reduce the effect.

In an industry faced with ever increasing fuel and construction costs, the desire to employ higher loadings and stronger absorbent concentrations is natural. However, many plants are not converting because of the increased corrosion and degradation problems encountered with higher loadings and/or higher absorbent concentrations. Several mild excursions above conventional concentrations and/or loadings on a commercial scale have been made with very poor results.

It would, therefore, be advantageous to find an inhibitor or inhibitor mixture capable of maintaining or reducing corrosion and/or degradation rates while employing loadings in excess of 50% of theoretical and absorbent concentrations in the 30 to 40 percent range.

BRIEF DESCRIPTION OF INVENTION

In accordance with the present invention it has been found advantageous to add at least above 50 parts of $Cu^{+2}$ salts, preferably copper carbonate, per million parts of aqueous absorbent solution used in gas-liquid contactors to remove and recover $CO_2$ from a gas stream containing both $CO_2$ and oxygen. In addition to the copper salts i.e., copper carbonate, one or more of alkali metal permanganates, dihydroxyethylglycine, alkali metal or ammonium thiocyanate, alkali metal carbonate, nickel or bismuth may be, and preferably are, added to provide an additional inhibitor in an amount of from about 50 parts of one or more of these inhibitors per million parts of absorbent solution. In a like manner, dihydroxyethylglycine in combination with thiocyanate and nickel and bismuth salts at lower concentrations will provide corrosion and degradation protection of gas treating solvents employed in $CO_2$ removal from $O_2$ containing environments.

These additives have been found to be particularly effective to inhibit both metal corrosion as well as absorbent degradation. Thus when, in accordance with the present invention, they are employed, aqueous-absorbent solutions can exceed thirty percent and $CO_2$ loadings can be as high as or above about 80 percent of theoretical for the absorbent even in the presence of oxygen as high as 4 to 7 percent, or even higher.

Absorbents found to be effectively inhibited are monoethanolamine (MEA), diethanolamine (DEA), triethanolamine (TEA), methyl diethanolamine (MDEA), sulfolane, diisopropylamine (DIPA) and the like.

While the inhibitor composition of the present invention is useful in absorbent solutions having less than thirty percent absorbent and loadings of less than fifty percent, they are most effective at the higher concentrations and loadings where the prior components have shown poor or ineffective protection.

It is of course to be understood that while concentrations above the preferred upper limit of 2000 parts per million parts of absorbent solution may be employed with slight possible improvement due to the increased concentrations, such is not normally desirable due to cost. Therefore, higher concentrations are deemed to be within the scope of the invention here described.

DETAILED DESCRIPTION OF THE INVENTION

It has now been found that when aqueous absorbents for the recovery of $CO_2$ from industrial gases, which contain appreciable oxygen, are employed in accordance with present day liquid-gas contact/regeneration processes parameters, coupled with high loadings of the $CO_2$ and 30 to 40% absorbent concentrations, the normal corrosion rate of metals in contact with such solutions and the thermal degradation of the absorbent (e.g. amine) can be markedly reduced by adding to the solution from 50 to about 2000 parts of $Cu^{+2}$, per million parts of absorbent solution as for example, copper carbonate ($CuCO_3$) with or without an additional 50 to 2000 ppm of one or more of the compounds, dihydroxyethylglycine (DEG), alkali metal permangante, alkali metal or ammonium thiocyanate, alkali metal carbonate and/or nickel or bismuth oxides. When the invention here set forth is employed it has been found that the use of activated carbon filters materially reduce the degradation of the amine solution and indirectly effect the corrosion rate.

A series of experiments were run to demonstrate the efficacy of the compositions of the present invention to effectively control corrosion in oxygen and $CO_2$ containing industrial gas absorption processes.

EXAMPLE 1

An 80% monoethanolamine aqueous solution (in order to obtain accelerated corrosion rates at elevated temperatures without use of pressure) was saturated with a $CO_2$ stream containing four percent (4%) oxygen and the saturated solution subjected to reflux at 255° F. for 44 hours. Mild steel coupons were immersed in the boiling liquid and their weight loss measured in mils penetration per year to determine the effectiveness of various inhibitor combinations. The results of such tests are set forth in the following table:

| Additive (ppm) | | | | Metal Loss |
|---|---|---|---|---|
| DEG[1] | $CuCO_3$ | SCN | $KMnO_4$ | mpy |
| — | — | — | — | 1.6 |
| 400 | 500 | — | — | 0.3 |
| 400 | 500 | — | 500 | 0.3 |
| 400 | 500 | 400 | — | 0.3 |
| 400 | 500 | — | 500 | 0.3 |
| 400 | 800 | — | 500 | 0.3 |

[1]DEG = dihydroxyethylglycine

EXAMPLE 2

In a similar manner as described in Example 1 employing 80% MEA the following results were obtained:

| Additive (ppm) | | | | | M.S.[1] Liq. Phase | |
|---|---|---|---|---|---|---|
| DEG | $CuCO_3$ | SCN | Ni | Bi | mpy | % Protection |
| — | — | — | — | — | 138 | Baseline |
| 400 | — | — | — | — | 142 | 0 |
| 400 | — | 400 | — | — | 97.4 | 29 |
| 400 | — | 400 | 50 | 5 | 0.3 | 99.8 |
| 400 | — | 400 | 50 | 5 | 39 | 71.7 |
| 400 | — | 400 | 50 | — | 34.5 | 75.0 |
| 400 | — | — | 50 | 5 | 95.5 | 30.8 |
| 400 | 500 | 400 | 50 | 5 | 1.2 | 99.1 |
| 400 | 500 | 400 | 50 | 5 | 0.9 | 99.3 |
| 400 | 500 | — | — | — | 0.8 | 99.4 |

[1]M.S. = mild steel

EXAMPLE 3

Finally several accelerated oxidative condition runs were made while sparging $CO_2$ and $O_2$ to provide a pad of 30 lbs. $CO_2$ and 15 lbs. $O_2$ over a refluxing (130° C) solution of 30 percent MEA. The pad maintained the solution saturated. The results of such tests over a 24 hour period for each test, run in triplicate, are set forth below:

| SPARKLER FILTER TEST 30% MEA—$CO_2$ Satd 130° C. 24 Hr. Test 1020 MS 30 lbs. $CO_2$ & 15 lbs. $O_2$ Pad | |
|---|---|
| INHIBITOR | CORROSION RATE-mpy |
| None | 40.7 |
|  | 52.1 |
|  | 43.7 |
| 200 ppm DEG | 52.1 |
|  | 65.6 |
|  | 40.4 |
| 100 ppm DEG | 23.9 |
|  | 44.5 |
|  | 51.9 |
| 200 ppm $CuCO_3.Cu(OH)_2.H_2O$ (eq. 56% $CuCO_3$) | 1.2 |
|  | .9 |
|  | 1.2 |
| 200 ppm $Cu^{+2}$ as $CuCO_3.Cu(OH)_2.H_2O$ | .6 |
|  | 1.6 |
|  | .9 |
| 100 ppm DEG + 200 ppm $CuCO_3.Cu(OH)_2.H_2O$ | 1.2 |
|  | .9 |
|  | 1.3 |
| 200 DEG + 200 ppm $CuCO_3.Cu(OH)_2.H_2O$ | .9 |
|  | .8 |
|  | 1.2 |
| 80 ppm DEG + 200 ppm $Cu^{+2}$ as $CuCO_3.Cu(OH)_2.H_2O$ | .5 |
|  | .9 |
|  | 1.4 |
| 200 ppm DEG + 200 ppm $Cu^{+2}$ as $CuCO_3.Cu(OH)_2.H_2O$ | .9 |
|  | .9 |
|  | .7 |

I claim:

1. In a process for removing carbon dioxide ($CO_2$) from industrial combustion gases containing the $CO_2$ and $O_2$ contacting the gas, in a gas-liquid contactor, with an aqueous solution which contains an alkanol amine absorbent-reactant; circulating the solution from the contactor to a regeneration step wherein the $CO_2$ is released from the absorbent, the $CO_2$ recovered and the essentially $CO_2$ free absorbent recycled to the contactor, the improvement which consists of employing as the essential additives to said solution, to reduce degradation of the absorbent under the conditions of use and corrosion of the metals in contact with said solution during use, at least above 50 ppm of copper$^{+2}$ and at least from 50 parts per million parts of solution one or more of the following: dihydroxyethylglycine, an alkali metal carbonate, an alkali metal or ammonium permanganate and nickel and/or bismuth oxides.

2. In a process for removing carbon dioxide ($CO_2$) from industrial combustion gases containing the $CO_2$ and $O_2$ contacting the gas, in a gas-liquid contactor, with an aqueous solution which contains an alkanol amine absorbent-reactant; circulating the solution from the contactor to a regeneration step wherein the $CO_2$ is released from the absorbent, the $CO_2$ recovered and the essentially $CO_2$ free absorbent recycled to the contactor, the improvement which consists of employing as the essential additives to said solution, to reduce degradation of the absorbent under the conditions of use and corrosion of the metals in contact with said solution during use, from 50 to 2000 ppm of copper as copper carbonate and at least from about 50 to about 2000 parts per million parts of the total solution of one or more of the following: dihydroxyethylglycine, an alkali metal carbonate, an alkali metal or ammonium permanganate, and nickel and/or bismuth oxides.

3. In a process for removing carbon dioxide ($CO_2$) from industrial combustion gases containing the $CO_2$ and $O_2$ by contacting the gas, in a gas:liquid contactor, with an aqueous solution which contains an alkanol amine absorbent-reactant; circulating the solution from the contactor to a regeneration step wherein the $CO_2$ is released from the absorbent, the $CO_2$ recovered and the essentially $CO_2$ free absorbent recycled to the contactor, the improvement which consists of employing as the essential additives to said solution, to reduce degradation of the absorbent under the conditions of use and corrosion of the metals in contact with said solution during use, from at least about 50 ppm of dihydroxyethylglycine and at least about 50 parts per million parts of a thiocyanate salt and nickel and/or bismuth oxides.

* * * * *